United States Patent [19]
Rezanka et al.

[11] Patent Number: 4,734,705
[45] Date of Patent: Mar. 29, 1988

[54] INK JET PRINTER WITH SATELLITE DROPLET CONTROL

[75] Inventors: Ivan Rezanka, Pittsford, N.Y.; Joseph M. Crowley, Morgan Hill, Calif.

[73] Assignee: Xerox Corporation, Stamford, Conn.

[21] Appl. No.: 895,417

[22] Filed: Aug. 11, 1986

[51] Int. Cl.$^4$ .............................................. G01D 15/18
[52] U.S. Cl. .......................................... 346/1.1; 346/75
[58] Field of Search ................................... 346/1.1, 75

[56] References Cited

U.S. PATENT DOCUMENTS

| | | | |
|---|---|---|---|
| 3,596,275 | 7/1971 | Sweet | 346/1.1 |
| 3,928,855 | 12/1975 | Helinski et al. | 346/1.1 |
| 3,949,410 | 4/1976 | Bassous et al. | 346/75 |
| 4,018,383 | 4/1977 | Paton et al. | 239/4 |
| 4,220,958 | 9/1980 | Crowley | 346/75 |
| 4,314,263 | 2/1982 | Carley | 346/140 R |
| 4,568,946 | 2/1986 | Weinberg | 346/75 |

OTHER PUBLICATIONS

IBM Journal of Research and Development, vol. 21, No. 1, 1977, by W. Pimbley & H. Lee, pp. 21-30, "Satellite Droplet Formation in a Liquid Jet".

*Primary Examiner*—E. A. Goldberg
*Assistant Examiner*—Gerald E. Preston
*Attorney, Agent, or Firm*—Robert A. Chittum

[57] ABSTRACT

An externally stimulated continuous stream ink jet printer which suppresses or controls the formation of satellite droplets so that they are not charged differently from the main droplets. Thus, when the two are merged, indeterminate charges are not produced which would impact the print quality of the printer. The satellites are suppressed by impressing on the printer ink streams a combination of time-varying pressures. In one embodiment, the time-varying pressures are generated by two time-varying voltages applied to the EHD electrodes. One pressure has a fundamental frequency with the second pressure having a second harmonic frequency, these two pressures having a predetermined phase and amplitudes with respect to each other. The fundamental frequency is selected for a required drop spacing to stream diameter ratio.

5 Claims, 6 Drawing Figures

A) REAR MERGING

B) FORWARD MERGING

INK JET PRINTER WITH SATELLITE DROPLET CONTROL

BACKGROUND OF THE INVENTION

1. Field of the Invention

This invention relates to continuous stream type ink jet printers, and more particularly, to such printers which emit a plurality of ink streams, each ink stream being synchronously stimulated by electrohydrodynamic (EHD) excitation.

2. Description of the Prior Art

Ink jet devices of the continuous stream type generally employ a printhead having a droplet generator with multiple nozzles from which continuous streams of ink are emitted under pressure. The ink is stimulated prior to or during its exiting from the nozzles so that the stream breaks up into a series of uniform droplets at a fixed distance from the nozzles. As the droplets are formed, they are selectively charged by the application of a charging voltage by electrodes positioned adjacent the streams at the location where they break up into droplets. The droplets which are charged are deflected by an electric field either into a gutter for ink collection and/or reuse, or to a specific location on the recording medium, such as paper, which may be continuously transported at a relatively high speed across the paths of the droplets.

One method of stimulating the ink stream is by acoustic excitation of the ink in the ink manifold of the printhead by a piezoelectric driver. The drive produces acoustic waves which traverse the ink manifold to the nozzles, perturbing or stimulating the jets or streams and causing uniform breakup of the jets in terms of break off length and phase. Thus, the drop generator manifold or reservoir has two functions, to distribute ink to the individual nozzles and to distribute acoustic energy to the individual streams to cause a controlled uniform breakup into droplets. Another method of stimulation of the ink streams is by electrohydrodynamic (EHD) excitation. In EHD stimulated ink streams, an electrode is generally placed in the proximity of each stream a short distance downstream from the nozzle. This electrode is biased by time varying voltage in respect of the ink stream and hence it has to be electrically isolated from the ink by, for example, a dielectric spacer. The distance from the beginning of the ink stream as it exits from the nozzle to the EHD electrode is defined by the dielectric spacer. The dielectric spacer has to function as an insulator in a hostile environment, being exposed to ink vapor, ink mist, and ink contamination during start up and shutdown of the ink stream.

When a liquid stream breaks up into droplets, it rarely produces droplets of a single size. Even when the break up is stimulated by pure sinusoidal pressure, the stream normally breaks up into a series of uniform large droplets separated by a single, much smaller droplet called a "satellite". Due to the fundamental processes participating in the ink jet droplet generation, the formation of ink droplets is often accompanied by simultaneous appearance of satellites. These smaller drops or satellites are, in general, unwanted since they adversely influence the droplet charging and cause printhead contamination and print quality defects. Normally, a satellite separates first from the stream in front of the main droplet, which then separates next. Later, the satellite merges backward into the main drop, which event is called "rear merge". Because the two drops were formed at different times, they may be exposed to different charging voltages in a continuous ink jet printer. Upon recombination, the total charge of the single drop will be indeterminate, leading to placement errors on the final image. This is called "bad rear merge".

The usual way to suppress the satellite formation in the conventional acoustic ink stream stimulation is to apply the excitation to the piezoelectric transducer with such an intensity that the nonlinearities on the way from the transducer to the droplet breakoff point prevent the separation of the satellite from the main droplet by giving rise to a higher harmonics in the ink stream. It is believed that the acoustic processes in the jet nozzle are particularly important for this control.

This approach can be relatively easily implemented for a printer with a single or a few jets. It is, however, much more difficult to use this satellite control for multi-jet acoustically driven arrays. Even when the formidable associated problems are solved, the high excitation intensity inherently causes a very short droplet break off length which imposes severe constraints on the printhead architecture.

U.S. Pat. No. 3,596,275 to Sweet discloses the basic concept of an EHD exciter. The disclosed electrohydrodynamic (EHD) device requires very high voltages and expensive transformers to obtain them. The high voltages represent an electrical complexity, high cost, and safety hazard. The high voltages needed to excite or pulsate the fluid column also interferes with the subsequent droplet charging step.

U.S. Pat. No. 3,949,410 to Bassous et al discloses an EHD exciter integrated into a nozzle. In connection with FIG. 4, they describe the fundamental EHD process first articulated by Sweet in his above-mentioned patent. Bassous et al report the periodic swelling and nonswelling of a fluid column due to the electric field associated with the geometry at the nozzle orifice. They further disclose the fluid mechanics principle that the wavelength of the swelling (i.e. droplet separation) is given by the velocity of the fluid divided by the frequency of the swelling or perturbations.

U.S. Pat. No. 4,220,958 to Crowley discloses a continuous stream-type ink jet printer wherein the perturbation is accomplished by electrohydrodynamic excitation. The EHD exciter is composed of one or more pump electrodes of a length equal to about one-half the droplet spacing. The multiple pump electrode embodiments are spaced at intervals of multiples of about one-half the droplet spacing or wavelength downstream from the nozzles.

U.S. Pat. No. 4,568,946 to Weinberg discloses a charge electrode means for sensing a charge on the individual ink droplets passing thereby and providing signals which can be used to control the timing of the charging electrical pulses applied to the charging electrodes. The charge electrode means comprises a pair of electrical insulating members mounted in spaced relation to one another so as to provide a gap between opposed surfaces thereof. Conductive charge electrode layers are provided on these opposed surfaces and are electrically connected.

An article entitled "Satellite Droplet Formation in a Liquid Jet" by Pimbley and Lee, IBM Journal of Research and Development, Vol. 21, No. 1, January, 1977, pages 21–30, discloses an investigation into the formation and behavior of satellite droplets. The two most relevant parameters that control satellite droplet formation are the amplitude of the perturbation and the wavelength-to-diameter ratio of this perturbation. Satellite formation is least likely to occur when the main drop spacing is five to seven times the jet diameter.

SUMMARY OF THE INVENTION

It is an object of this invention to provide means for suppressing formation of satellites or providing means for controlled separation and merging of satellites in continuous stream, externally stimulated ink jet printers by applying pressure signals containing higher harmonics to the ink streams emitted therefrom by the proper phasing and frequency of electrical signals applied to the exciting electrodes which surround the ink streams.

In the present invention, satellites formed in externally stimulated ink streams are controlled by impressing higher harmonic excitation, together with the fundamental frequency, on the ink stream. In the preferred embodiment, this is done by biasing the EHD electrode with a predetermined combination of time varying voltages. Since the interactions involved are well understood electrostatic and electrohydrodynamic interactions, the concerns about the process control, uniformity, and stability, which are troublesome in acoustic excitation are absent here.

The externally stimulated ink jet printer with satellite control is operated with a fundamental frequency such that the ratio between the drop spacing ($\lambda$) and the stream diameter (d) exceed $2\pi(\lambda/d>2\pi)$. In this case, both the fundamental excitation and the second harmonic grow on the ink stream. Hence, neither the fundamental nor the second harmonic needed to be of particularly high amplitude. This provides two advantages. First, even the fast ink streams and small diameter streams can be electrohydrodynamically stimulated with biases safetly lower than the electrical breakdown limit. Secondly, longer break off distance than available with the acoustic method results are readily attainable, allowing more freedom for the printhead architecture.

Alternatively, the satellite separation and merging pattern may be changed from the bad rear merge case to a good rear merge. This is accomplished when the second harmonic in the voltage signal has the phase in respect of the fundamental from the interval of 110 degrees to 180 degrees and the $\lambda/d$ ratio was from the interval 6.4 to 8.8. Under such conditions, the satellite separated from its main droplet (i.e., from the droplet from which it merged later) only after the main droplet, with a ligament still attached to the satellite in front, had separated from the jet stream. Since the whole ink mass which later coalesced into one droplet separated here from the ink stream at one time, 360 degrees of phase is available for droplet charging.

For the same range of $\lambda/d$ and the voltage phase from the range 20 degrees to 100 degrees, forward merging satellites are produced. This forward merge is also known from acoustic excitation where, however, the latitude is not sufficient to operate it independently of other regimes. Alternatively, when $\lambda/d$ was in the interval from 6.8 to 7.6 and preferably from 6.9 to 7.5, and the phase was in the interval from 120 degrees to 160 degrees and preferably close to 140 degrees, the satellite separation never occurred and the no satellite regime was achieved.

The above effects and the ink jet stream stimulation are increased when a double layer electrode is used. The biasing is such that the fundamental jet stream stimulations impressed from each electrode is in phase while the second harmonic stimulations from the two layers have the phase shift 180 degrees with respect to each other. The effective thickness of the electrode bilayer (the length of the jet stream surface where the field is strong) is close to one-half of the droplet spacing. In this case, both the fundamental excitation and the second harmonic excitation are impressed on the jet stream in a manner close to the most efficient one in terms of initial stimulation versus a given voltage amplitude.

The foregoing features and other objects will become apparent from a reading of the following specification in connection with the drawings, wherein like parts have the same index numerals.

DESCRIPTION OF THE PREFERRED EMBODIMENT

Figure 1:
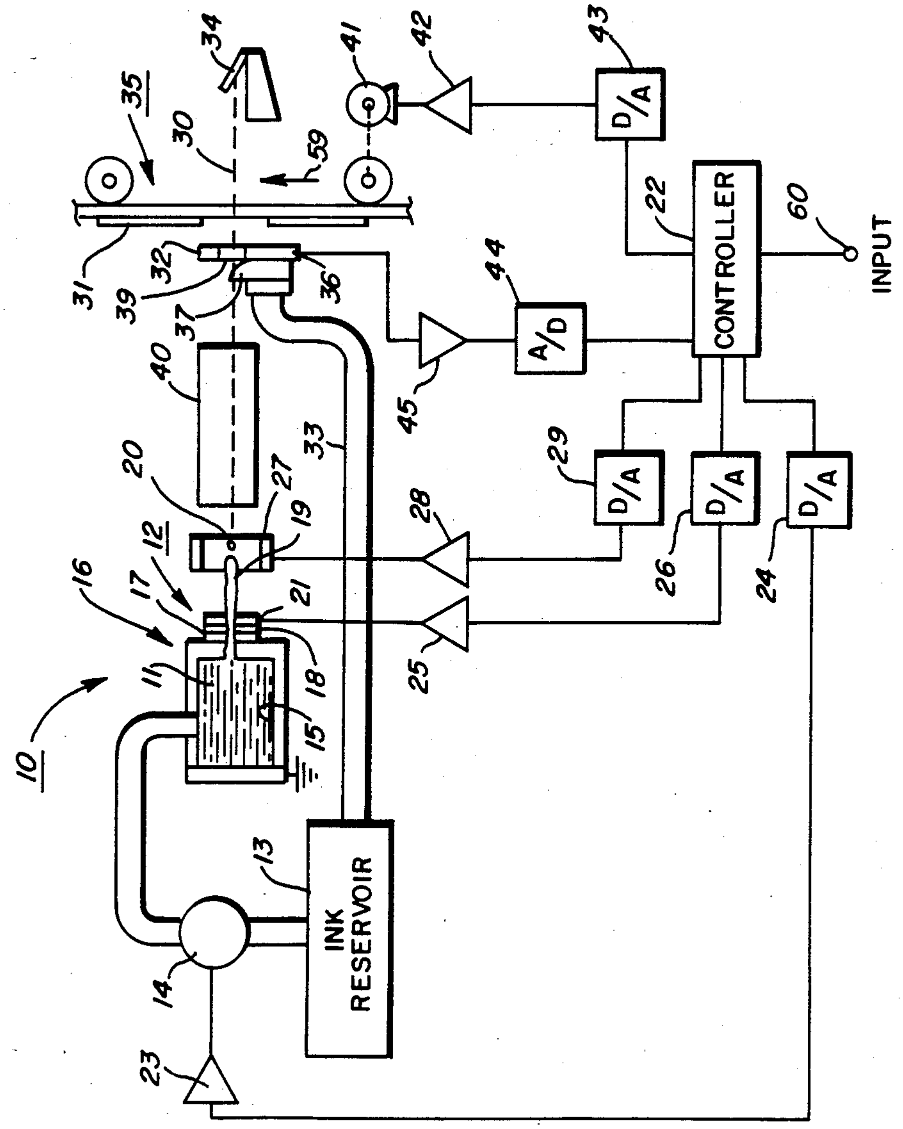
FIG. 1 is an elevation view in schematic form of a continuous stream-type, pagewidth ink jet printer having electrohydrodynamic electrodes for stimulating the ink stream emitted from an ink manifold of the printer. The printer controller applies signals to the EHD electrodes for controlling the merger of ink satellites into the droplets by proper phasing and frequency of the signal to the electrodes.

Referring to FIG. 1, a continuous stream-type ink jet printer 10 is depicted employing electrohydrodynamic electrodes 21 for electrohydrodynamically stimulating its ink streams 19. Fluid ink 11 is contained in reservoir 13 and is moved by pump 14 into the manifold 15 of the ink droplet generator 16. The droplet generator has an integral nozzle plate 17, dielectric spacer 18, and electrohydrodynamic electrodes 21, referred to hereinafter as the integral nozzle plate assembly 12, with a plurality of nozzles or orifices 38 (shown in FIG. 2), each of which emit a continuous stream of ink 19. Droplets 20 are formed from the stream at a finite distance from the nozzles 38 due to regular electrohydrodynamic stimulation of the synchronous ink jet streams by the electrodes, as discussed more fully later. The EHD electrodes are biased by time varying voltage in respect to the ink jet stream and hence they have to be electrically isolated from the ink by a dielectric material or spacer 18. The pressure of the ink in the manifold 15 is controlled by the pump 14 and establishes the velocity of the droplets 20. The pulsation stimulation introduced by the EHD electrodes 21 establishes the rate of droplet generation. Both the velocity and droplet frequency are under the control of a microcomputer or controller 50.

Droplet velocity is controlled by regulating the pump to appropriately increase or decrease the ink pressure in the manifold 15. The controller communicates with the pump 14 via amplifier 23 and digital-to-analog (D/A) converter 24. The controller impresses the EHD electrodes with a predetermined time varying voltage by means of amplifier 25 and D/A converter 26, as discussed later.

A charging electrode 27 for each nozzle is located at the position where the droplets 20 are formed from streams 19. The charge electrodes are also under the control of the controller 50. The charge electrodes 27 are coupled to the controller by means of an amplifier 28 and D/A converter 29. The function of the charging electrodes is to impart a negative, positive, or neutral charge to droplets 20. The fluid ink is conductive and is electrically coupled to ground through the manifold 15. When a voltage is applied to the electrode 27 by the controller at the instant of droplet formation, the droplet assumes a charge corresponding to the voltage applied to the electrode. In the embodiment illustrated in FIG. 1, uncharged droplets follow an undeflected flight path 30 to the recording medium 31. Charged droplets are deflected left and right of path 30 in a plane perpendicular to the surface of FIG. 1, depending on the sign of the charge. Predetermined values of positive and negative charge for a droplet 20 will cause it to follow a path that directs it into a gutter 37 located to the right or left of centerline paths 30. The ink collected in gutter 37 is returned to the reservoir 13 via conduit 33. Since FIG. 1 is a side view, only one column is seen in that Figure, but it should be understood that a series of nozzles extend along the manifold to generate a series of parallel ink columns.

Droplets which are either uncharged or charged to a level insufficient to cause their trajectory to lead to gutter 37 are directed past a droplet sensor assembly 32 to recording medium 31. The droplet sensor assembly is used to sense passage of ink droplets towards the recording medium and modify printer operation to insure that ink droplets from the plurality of ink streams are properly positioned on the recording medium. When a stitched system is utilized, as in the preferred embodiment, the droplet sensor assembly insures that the ink droplets are properly stitched together to allow each incremental region on the recording medium to be accessed by the droplets from one of the droplet generator nozzles. An example of the use and application of a typical droplet sensor assembly 32 is disclosed in U.S. Pat. No. 4,255,754 to Crean et al entitled "Fiber Optic Sensing Method and Apparatus for Ink Jet Recorders", which has been assigned to the assignee of the present invention.

A second gutter 34 for recirculating ink droplets is used to intercept droplets generated while calibrating the system with the aid of the droplet sensor assembly 32. One application to which the present invention has particular applicability is a high speed ink jet device wherein successive sheets of recording medium or paper 31 are transmitted past the ink jet printhead and encoded with information. Experience has indicated that it is desirable to recalibrate the printer at periodic intervals to insure that the droplets 20 are directed to desired regions on the recording member 31. To accomplish this calibration, ink droplets are generated and caused to travel past the sensor assembly when no recording member 31 is in position to receive those droplets. In the calibrate mode of operation, it is therefore necessary that a gutter 34 be positioned to intercept droplets which would otherwise strike the recording medium. A transport mechanism 35 is also shown in FIG. 1. The transport 35 is used to move individual sheets of recording medium, such as paper, past the droplet streams at a controlled rate of speed. Since the present printer is a high speed device, a mechanism must be included in the transport 35 for delivering paper to the transport and for stripping paper away from the transport once it has been encoded by the printer 10. These features of the transport have not been illustrated in FIG. 1, since it is not related to the EHD stimulation of ink streams which is the subject of the present invention.

The stitch sensors described in the Crean et al patent referred to above, are mounted on a sensor support board 36. The support board has an aperture 39 that permits the droplets 20 emitted by the nozzles to pass therethrough and either be collected by the gutter 34 during calibration or printed on the recording medium 31. A charged droplet is deflected due to the electrostatic field between deflection electrodes 40 associated with each nozzle. The deflection electrodes 40 have very high voltages coupled to them to create the deflection fields. The potential difference between the voltages is generally in the magnitude of 2,000 to 3,000 volts. The magnitude of the voltage applied to the charging electrode 27 is generally in the range of 10 to 200 volts.

Ink droplet generation, charging, and recording medium transport are all controlled by the controller 50 which interfaces with the various components of the printer 10 by digital-to-analog and analog-to-digital converters. The controller comprises an input 60 for receiving a sequence of digital signals representative of desired voltages to be applied to the charging electrodes 27. The controller then generates multi-bit digital signals representative of desired charging voltages. As stated above, digital-to-analog converter 29 converts the digital signals representative of the desired charging voltage to an analog signal which is coupled to a power amplifier 28, which in turn energizes the charging electrode 27.

In addition to generating the charging voltage for the plurality of charging electrodes 27, the controller 50 receives inputs from the sensor assembly 32 via an analog-to-digital converter 44, controls the speed of movement of the recording medium 31 via a second digital-to-analog converter 43 which through amplifier 42 drives motor 41, controls perturbation of the ink jet streams by EHD excitation by the electrodes 21 through a third digital-to-analog converter 26, and controls the pressure maintained inside the manifold 15 by pump 14 with a fourth digital-to-analog converter 24. As disclosed in the U.S. Patent to Crean et al, sensor assembly 32 uses a pair of photodetectors to sense ink droplets, one each for two output fibers that are used to generate an electrical zero crossing signal. The zero crossing signal is used to indicate alignment or misalignment of a droplet relative to a bisector of a distance between the two output fibers. The sensor of this patent employs one input optical fiber with each two output optical fibers for each stitch point. The remote ends of each output fiber are coupled to separate photodetectors (not shown). The photodiodes are coupled to differential amplifiers (not shown), so that the output of the amplifiers are measurements of the location of droplets relative to the bisector of the distance between the output fiber ends. The amplifier outputs are coupled to a comparator 45 which in turn is coupled to the controller 50 via analog-to-digital converter 44 and used in servo loops to position subsequently generated droplets to the bisector location. By using one of the zero crossing signal detectors at a location between adjacent endmost droplets thrown from separate adjacent nozzles, the stitch point between these nozzles can be controlled so that the segments of each line of droplets to be printed by each nozzle may be adjusted to prevent gaps or overprinting on the recording medium 31.

Anything that can introduce a pressure variation into an ink jet stream can excite breakup. Most ink jet printers use acoustic waves generated by piezoelectric elements, but electrostatic forces can also be used and were in fact suggested by Sweet in his U.S. Pat. No. 3,596,275. At first, it was thought that the electrostatic forces were too weak to be useful in printers, but recently methods have been developed by Crowley and disclosed in his U.S. Pat. No. 4,220,958 to take advantage of the increased electric field strengths and small gaps and the resident effects of the half wave exciters to reduce the breakup length to values short enough to be practical.

Figure 2:
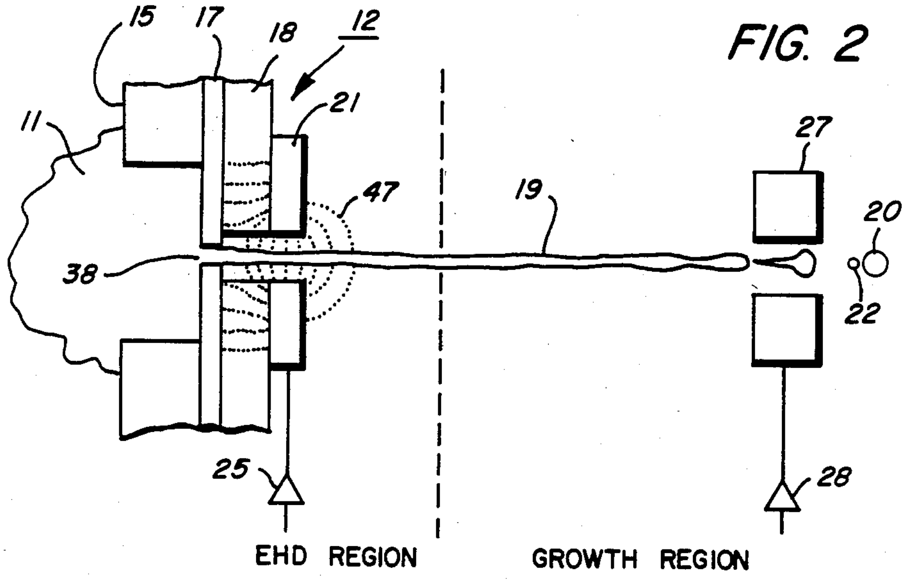
FIG. 2 is a schematic diagram of an ink stream of the ink jet printer of FIG. 1 showing satellite formation in an ink stream breakup.

The principle of EHD excitation is illustrated in FIG. 2 which schematically shows a cross-sectional view of one ink jet stream from the manifold nozzle 38 to the charging electrode 27 whereat the stream breaks up into droplets 20 and satellite 22. The ink stream issues from nozzle 38 in nozzle plate 17 without any acoustic drive. It continues undisturbed until it enters the EHD electrodes 21, which is driven by a time varying voltage via controller 22. Each EHD electrode produces an electric field 47 through which the ink streams pass. Since the ink stream is both conducting and grounded, charges are induced on its surface which is then attracted by the oppositely charged electrode. This attractive force on the surface corresponds to a negative pressure inside the ink stream and since the electrode voltage varies in time, the internal pressure of the ink stream also varies. This is the pressure variation which replaces acoustic excitation. The ink stream disturbance caused by the pressure variations produced by the electrostatic forces grows via surface tension to eventually form the droplet some distance downstream. The downstream growth is unaffected by the source of the disturbance, and proceeds in exactly the same manner as for acoustic excitation.

Figure 3:
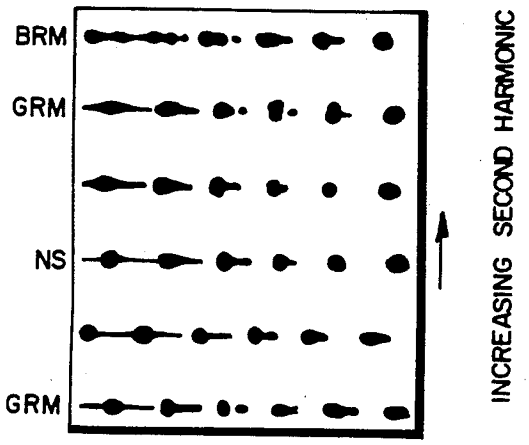
FIG. 3 shows typical satellite patterns with second harmonic excitation of the EHD electrodes that produces rear merging satellites.
Figure 4:
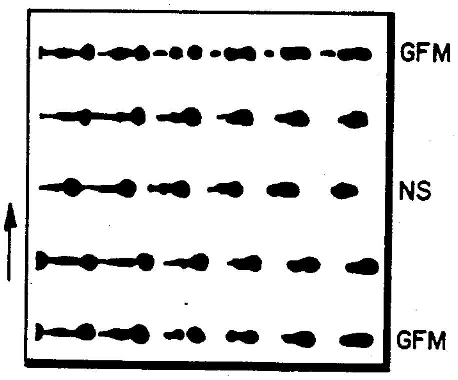
FIG. 4 shows typical satellite patterns with second harmonic excitation which shows forward satellite merging with the ink droplets.

An ink stream normally breaks up into a series of uniform large drops 20 separated by much smaller drops called satellites 22. If only a fundamental pressure is applied to the ink stream, satellite formation will always be in the pattern where the satellite separates first from the ink stream in front of the main droplet which then separates next. Later, the satellite merges backward into the main drop. This merger is called rear merge. Because the satellite and droplet were formed at different times, they may be exposed to a different charging voltage. Upon recombination, the total charge on the single drop will be indeterminate leading to placement errors on the final image. This is called "bad rear merge" or "brm". With the addition of a controlled second harmonic, however, a wide variety of additional satellite patterns are observed. Two typical sequences of observations are shown in FIGS. 3 and 4. In the first sequence of FIG. 3, the second harmonic phase is held at 150 degrees, while its amplitude is increased from a low value at the bottom of the Figure to a high value at the top. The lowest sequence shows rear merging, but the satellite was formed from a parent droplet and not from the jet stream itself. Their coalescence will have no effect on the final charge of the droplet and hence on its trajectory. This is referred to as a "good rear merge" or "grm". If the amplitude of the harmonic is large enough, satellite formation is suppressed completely to give the no satellite (ns) form shown in the third sequence up from the bottom of FIG. 3. Further increase in the harmonic level gives another good rear merge, followed by a bad rear merge.

If the harmonic phase is changed to 60 degrees, a different set of satellite patterns emerge as shown in FIG. 4. At the lowest level of second harmonic, the bottom sequence, both the main droplet and the developing satellite separate from the jet stream while they are still attached. Shortly afterward, the trailing satellite breaks off behind the main droplet, but it later moves forward to coalesce. The resulting droplet consists only of material broken from the ink stream at the same time. This is called a "good forward merge" or "gfm". Further increases in the harmonic content gives the no satellite (ns) condition, followed by a good forward merge, as shown in the topmost sequence of FIG. 4. In some operating conditions, the satellite may catch up with a preceding droplet which separated before the satellite and upon recombination the total charge of the single droplet will be indeterminate. This is called a "bad forward merge" or "bfm" condition.

Figure 5:
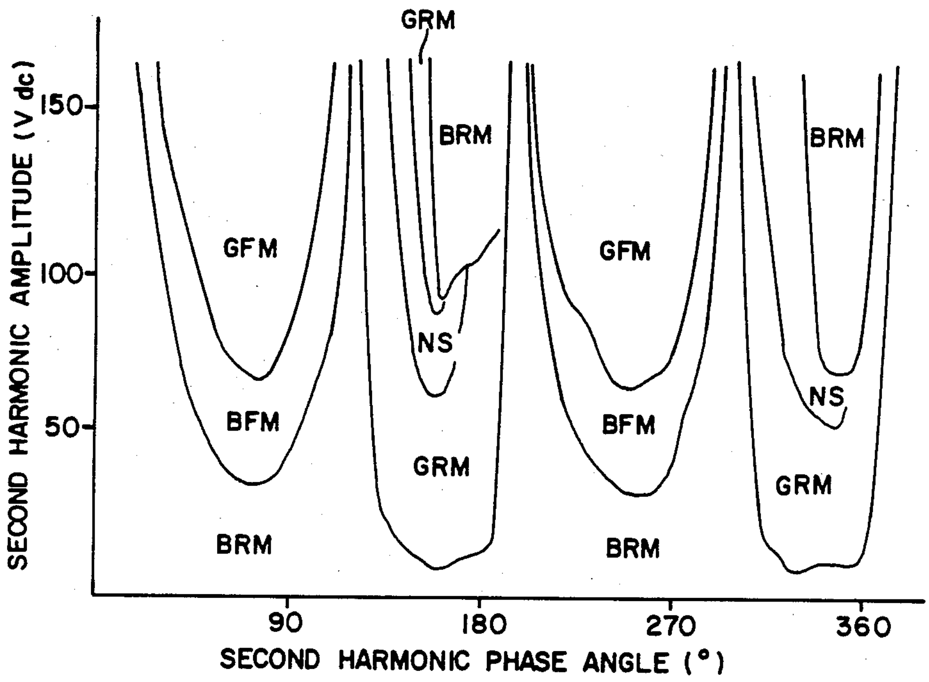
FIG. 5 shows satellite and no satellite latitudes for various harmonic amplitudes and phases for a typical ink jet operating at a given velocity.

For designing a control scheme for a particular ink jet stream, it is useful to display all of the possibilities which result from various combinations of harmonic amplitude and phase. One example, obtained from experiments on a ink jet stream operating at a given velocity, with constant frequency and approximately constant fundamental amplitude, is shown in FIG. 5. The lowest harmonic amplitudes always give bad rear merge, which is the normal operating condition of an ink stream excited by single frequency. Near 75 degrees and 255 degrees, the behavior changes to bad forward merge and then to good merge as the amplitude is increased. Near the other intermediate phases (165 degrees and 345 degrees), the second harmonic produces first a good rear merge, then a no satellite, or a good rear merge condition, and finally a bad rear merge. This chart has been considerably simplified by the omission of additional satellite patterns of less interest for ink jet printing. The no satellite region, for instance, can be divided into several sub-regions in which the satellite droplets may form from the jet, but rejoin before the main droplet separates. For large second harmonic amplitudes, several droplets may form and then rejoin. Some of these additional modes can be seen in FIGS. 3 and 4.

Figure 6:
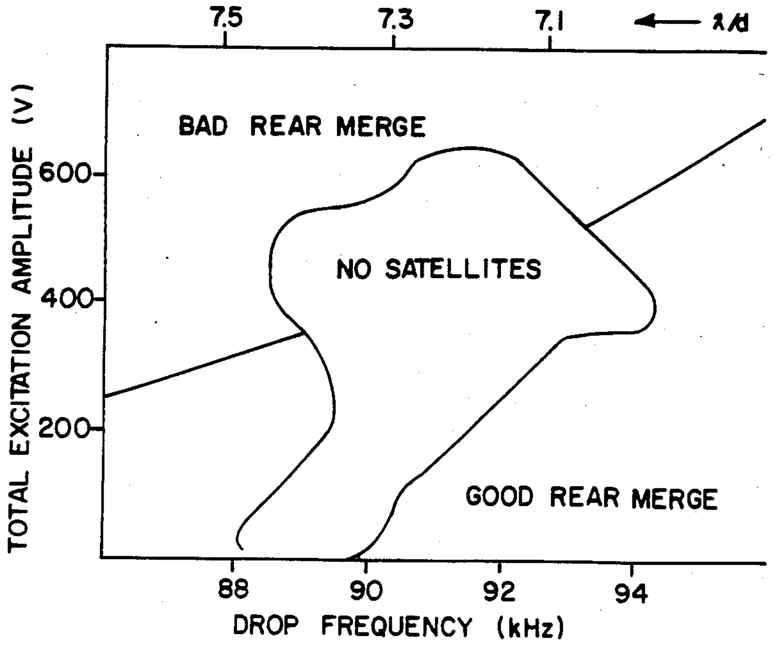
FIG. 6 shows the satellite and no satellite latitude in total amplitude and frequency for a ink jet stream operated with a constant second harmonic phase angle and with a constant ratio of first harmonic to second harmonic amplitude.

The sensitivity of the no satellite regions to total excitation amplitude and frequency is shown in FIG. 6. The ink stream is operated with a constant second harmonic phase angle and with a constant ratio of first harmonic to second harmonic amplitude. The nominal conditions correspond to no satellite condition. Variations in the fundamental frequency and the total amplitude of the driving voltage can change this satellite behavior as indicated with good rear merge occuring at lower voltages and bad rear merge at higher ones. Changes in the frequency with constant ink stream velocity also change the ratio of wavelength to diameter as indicated in the upper horizontal scale. Reliable operation within the no satellite region, however, is well within the capability of standard electronics.

The electric pressure applied to the ink stream by the EHD electrodes is proportional to the square of the voltage.

$$p(t) \approx V(t)^2$$

The voltage used in developing the data disclosed in FIGS. 3 through 6 was the sum of a dc bias and two independent sinusoids, $$V(t) = V_0 + V_a \sin\omega_a t + V_b \sin(\omega_b t + \Phi)$$

Multiplying sinusoids always yields sinusoids at frequencies which are sums or differences of the original sinusoids. For the three frequencies used here (0, $\omega_a$, $\omega_b$,), there are eight possible pressure frequencies after eliminating duplicates; namely:

$$\omega = 0,\ \omega_a,\ \omega_b,\ 2\omega_a,\ 2\omega_b,\ \omega_a+\omega_b,\ \omega_a-\omega_b,\ \omega_b-\omega_a$$

For the first and second harmonic excitation, one of these frequencies equals the desired fundamental $\omega$, and a second one should equal the desired second harmonic, $2\omega$. There are 7 non-zero frequencies possible in the pressure so we may chose from $7 \times 6 = 42$ permutations of frequencies in the voltage input. Some of these are duplicates and some are not possible, but the desired voltage drive can be selected from the possibilities from frequency combination giving first and second harmonics; that is, combinations of $\omega_a/\omega$ and $\omega_b/\omega$. Two of them were selected for the preferred embodiment. In the first, the voltage applied to the electrode was $$V = V_0 + V_a \cos 2\omega t + V_b \cos(3\omega t + \Phi)$$

The fundamental and second harmonic components of the pressure produced by this voltage are given by:

$$p \approx V_a V_b \cos\omega t + 2 V_0 V_a \cos(2\omega t - 2\Phi) + \text{etc.}$$

This choice is especially convenient because the amplitudes of the two harmonics can be independently controlled. If the amplitude $V_a$ is held constant, the fundamental pressure is proportional to $V_b$, while the second harmonic is proportional to the dc bias $V_0$. The second choice, $$V = V_a \cos\omega t + V_b \cos(2\omega t + \Phi)$$

leads to the electrical pressure expression:

$$p \approx V_a V_b \cos\omega t + \tfrac{1}{2} V_a^2 \cos(2\omega t - \Phi)$$

The driving voltages are synthesized in such a manner that the two voltage amplitudes could be changed together while keeping the ratio of $V_a/V_b$ constant. Under these conditions, the pressure amplitude could be changed while keeping the harmonic ratio constant. In either of the choices, the phase relation between the second harmonic and the fundamental of the pressure excitation is independent of the amplitudes, and is determinable solely by the phase of the voltage signal. This is not necessarily true for the other choices leading to a more complicated relationship between the voltage drive and the pressure excitation applied to the ink stream.

In the electrohydrodynamically stimulated streams of ink of the present invention, satellites are controlled by impressing higher harmonic excitation together with the fundamental frequency on the ink stream while biasing the EHD electrode 21 with a predetermined combination of time varying voltages. Since the interactions involved are well understood electrostatic and electrohydrodynamic interreactions, the concerns about the process control, uniformity, and stability, which are troublesome in acoustic excitation are avoided. The EHD stimulated ink stream will have satellite control when operated with a fundamental frequency such that the ratio between the droplet spacing or wavelength ($\lambda$) and the ink stream diameter (d) exceeded $2\pi(\lambda/d > 2\pi)$. In this way, both the fundamental excitation and the second harmonic grow on the ink stream. Hence, neither the fundamental nor the second harmonic need to be of relatively high amplitude. This means that high velocity ink streams with small diameters may be stimulated with biases safely lower than the electrical breakdown limit. In addition, longer breakoff distances than that available in the acoustic method is available allowing more freedom for the printhead design. When the combination of fundamental frequency and second harmonic frequency of suitable phase amplitude and frequency are impressed on the EHD electrodes, satellite separation and satellite merging patterns may be changed from unacceptable merge cases to usable merge conditions as discussed above.

When the second harmonic and the voltage signal had the phase in respect of the fundamental from the interval of 110 degrees to 180 degrees and the $\lambda/d$ ratio was from the interval 6.4 to 8.8, satellites separated from its main droplet (that is, from the droplet with which it merged later) only after the main droplet had separated from the ink stream with a ligament still attached between the satellite and the droplet. Since the whole ink mass, which later coalesced into one droplet, separated from the ink stream at one time, 360 degrees of phase is approximately available for droplet charging. For the same range of $\lambda/d$ and for the voltage phase from the range 20 degrees to 100 degrees, forward merging satellites are produced. This forward merge is also known from acoustic excitation where, however, the latitude is not sufficient to operate independently of other regimes. When the $\lambda/d$ was in the interval from 6.8 to 7.6 and preferably from 6.9 to 7.5 and the phase was in the interval from 120 to 160 degrees and preferably close to 140 degrees, the satellite separation never occurred and the no satellite regime was achieved.

The electrohydrodynamic effects and the ink stream stimulation are increased when a double layer EHD electrode (not shown) is used. The biasing is such that the fundamental jet stream stimulation impressed from each electrode is in phase while the second harmonic stimulations from the two layers have the phase shift 180 degrees in respect of each other. The effective thickness of the electrode bilayer (the length of the ink stream surface where the field is strong) is close to one half of the drop spacing. In this case, both the fundamental excitation and the second harmonic excitation are impressed on the ink stream in a manner close to the most efficient one, in terms of the initial stimulation versus a given voltage amplitude.

Although the foregoing illustrates the preferred embodiment of the present invention, other variations are possible. The required pressures can also be generated by any other available method, particularly, by the piezoelectric transducers commonly used in ink jet printers. For example, a piezoelectric transducer (not shown) could be mounted on the nozzle plate 17 or within the acoustic cavity of a typical droplet generator (not shown) of an ink jet printer. All such variations as will be obvious to one skilled in the art are intended to be included within the scope of this invention as defined by the following claims.

We claim:

1. An improved continuous stream-type pagewidth ink jet printer of the type having a pressurized ink filled manifold with a nozzle plate containing a plurality of nozzles from which ink streams are emitted, the ink streams being externally stimulated by a time varying pressure to cause them to break up into droplets at a predetermined distance from the nozzles whereat the droplets are charged in accordance with digitized data signals, the charged droplets following flight paths through an electrostatic field to specific pixel locations on a recording medium, wherein the improvement comprises:

stimulating the ink streams with a predetermined time-varying pressure which can be represented by a combination of two time-varying components, one being a predetermined fundamental frequency component and the other component being a second harmonic component of the fundamental frequency component, the magnitude, phase, and frequency range of said components being selected such that they both grow on the ink streams, so that the combination of said two time-varying pressure components suppress or control the formation of satellites.

2. The improved ink jet printer of claim 1, wherein the time-varying pressure is generated by a piezoelectric transducer mounted on the nozzle plate.

3. The improved ink jet printer of claim 1, wherein the time-varying pressure is generated by a time-varying voltage applied to EHD electrodes.

4. The improved ink jet printer of claim 1, wherein the phase of the second harmonic frequency is within 110 degrees to 180 degrees of that of the fundamental frequency; and wherein the droplets have a wavelength ($\lambda$) and the ink streams have a diameter (d) such that the ratio $\lambda/d$ has a range of 6.4 to 8.8, in which said $\lambda/d$ range causes the satellite droplets to be either suppressed or controlled ensuring accurate placement of ink droplets on the recording medium.

5. A method of suppressing or controlling the formation of satellites in a continuous stream type ink jet printer comprising:

supplying pressurized liquid ink to a manifold having a nozzle plate with a plurality of nozzles therein, the interior of the manifold being in communication with the nozzles so that the ink flows therefrom in streams directed towards a recording medium; and generating and applying a time-varying pressure to each ink stream for stimulating thereof, the stimulation causing the ink streams to break up into droplets a fixed distance from the nozzles whereat they are charged by charging electrodes in response to digitized data signals received by said charging electrodes, so that the individually charged droplets impact predetermined pixel locations on the recording medium, said time varying pressure being represented by the combination of a fundamental pressure frequency component and at least one higher harmonic pressure frequency component, phase and frequency range of the components being such that they both grow on the ink streams.

* * * * *